(12) United States Patent
Remes et al.

(10) Patent No.: US 12,422,417 B2
(45) Date of Patent: *Sep. 23, 2025

(54) DETERMINATION AND CORRECTION OF RETENTION TIME AND MASS/CHARGE SHIFTS IN LC-MS EXPERIMENTS

(71) Applicant: Thermo Finnigan LLC, San Jose, CA (US)

(72) Inventors: Philip M. Remes, San Jose, CA (US); Ping F. Yip, Salem, MA (US)

(73) Assignee: THERMO FINNIGAN LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/528,426

(22) Filed: Dec. 4, 2023

(65) Prior Publication Data

US 2024/0118253 A1 Apr. 11, 2024

Related U.S. Application Data

(62) Division of application No. 16/527,990, filed on Jul. 31, 2019, now Pat. No. 11,841,352.

(51) Int. Cl.
*G01N 30/86* (2006.01)
*G01N 30/72* (2006.01)

(52) U.S. Cl.
CPC ..... *G01N 30/8668* (2013.01); *G01N 30/7233* (2013.01); *G01N 2030/862* (2013.01); *G01N 30/8644* (2013.01); *G01N 30/8665* (2013.01)

(58) Field of Classification Search
CPC .......... G01N 30/8668; G01N 30/7233; G01N 30/8644; G01N 30/8679; G01N 2030/862; G01N 30/8665
(Continued)

(56) References Cited

U.S. PATENT DOCUMENTS 9,625,470 B2 4/2017 Coon et al.
11,841,352 B2 * 12/2023 Remes ............... G01N 30/7233
(Continued)

FOREIGN PATENT DOCUMENTS

JP 3668594 B2 7/2005
WO 2017093861 A1 6/2017
(Continued)

OTHER PUBLICATIONS

English translation of JP 3668594, Jul. 6, 2005. (Year: 2005).
(Continued)

*Primary Examiner* — Michael P Nghiem
(74) *Attorney, Agent, or Firm* — Thomas F. Cooney

(57) ABSTRACT

Methods are described for the automatic determination and correction of retention time shift of a MS data set relative to a control data set, to correct for retention time drifts endemic to targeted LCMS analyses. In an embodiment, a 2D grid of periodic MS spectra versus time is collected for a control experiment, and RT windows are determined with an additional set of unscheduled mass spectral analyses. During successive experiments, spectra from periodic MS scans are used to determine the correspondence between the current time and the time in the control experiment. The active set of MSn scans to be acquired by the instrument is then determined as the scans with adjusted retention time windows that bracket the corrected retention time.

4 Claims, 12 Drawing Sheets

(58) Field of Classification Search
USPC .......................................................... 702/25
See application file for complete search history.

(56) References Cited

U.S. PATENT DOCUMENTS

2006/0131222 A1* 6/2006 Norton ............... G01N 30/8668
422/82.05
2019/0353627 A1 11/2019 Kurotobi et al.

FOREIGN PATENT DOCUMENTS

WO  WO-2018035059 A9 *  3/2019  ........... C07K 14/005
WO     2020044161 A1      3/2020

OTHER PUBLICATIONS

Bailey et al., "Intelligent Data Acquisition Blends Targeted and Discovery Methods." J. Proteome Res., 13(4), 2014, pp. 2152-2161.
Gallien et al., "Large-Scale Targeted Proteomics Using Internal Standard Triggered-Parallel Reaction Monitoring (IS-PRM)*[S].", Molec. & Cell. Proteomics, 14(6), 2015, pp. 1630-1644.
Sangvhi et al., "Demonstration of SRM Method Visualization and Automated On-the-fly Retention Time Updating for Targeted Peptide Quantitation and SRM Visualization," Proc. 64th ASMS Conf. Mass Spec., 2016, 3 pages.
Bovik, Alan C., "Basic Tools for Image Fourier Analysis", in: Bovik, Alan C., ed. Handbook of image and video processing. Academic press, 2005, pp. 57-72.

* cited by examiner

DETERMINATION AND CORRECTION OF RETENTION TIME AND MASS/CHARGE SHIFTS IN LC-MS EXPERIMENTS

CROSS REFERENCE TO RELATED APPLICATION

This application is a divisional of commonly assigned U.S. patent application Ser. No. 16/527,990, now U.S. Pat. No. 11,841,352, which was filed on Jul. 31, 2019, the disclosure of which is hereby incorporated herein by reference in its entirety.

TECHNICAL FIELD

The present disclosure to Liquid Chromatography coupled with Mass Spectrometry. More particularly, the present disclosure relates to real-time correction of retention-time and/or mass-to-charge drifts or shifts during targeted analyses of a plurality of target analytes during the course of an LC-MS experiment.

BACKGROUND

Targeted liquid chromatography (LC) mass spectrometry (MS) is a technique used to quantitatively measure the abundance of a set of analyte ions. In a typical implementation, the instrument acquires tandem MS/MS data for each analyte only during its expected elution time, thereby maximizing the sensitivity of the analysis. This is often referred to as "run-time scheduling". A simple schematic example of run-time scheduling is depicted in FIG. 1A which is a hypothetical graph of the time variation of a mass spectrometer signal (for example, total ion current) as might be observed during elution and detection of two analytes of interest, $s_1$ and $s_2$, if such analytes are present in a sample. These two analytes may be part of a larger set of A total targeted analytes, $\{s_1, s_2, \ldots, s_A\}$ that are being searched for in the sample during the mass spectral analysis, wherein each specific analyte may or may not be present in the sample. Peaks 91 and 92 represent the contributions of analyte $s_1$ and analyte $s_2$ to the signal, respectively. Each peak is detected only during the elution time of the particular respective analyte, if present. Whereas the total run time may be measured in minutes to hours, the width of each peak may only be on the order of seconds. A conventional run-time scheduling technique assumes that the times of appearance of the various peaks are sufficiently well known, a priori, that the times of searching for each analyte (so-called time "windows") may be scheduled in advance. Thus, according to the schedule, the instrument may begin searching for ions that are characteristic of analyte $s_1$ at retention time 94 (a window start time) and terminate the search at time 95 (a stop time for the window). Likewise, the search for ions characteristic of analyte $s_2$ may be limited to the time range (or window) between retention times 96 and 97. The narrower the scheduled time windows about each analyte, the smaller the number of analytes that need to be analyzed at any given moment, allowing for longer dwell times and higher sensitivity analysis.

A disadvantage of the run-time scheduling approach is that the specific elution times of each analyte are subject to drift as the LC column ages, as the LC gradient parameters are changed, and when a new LC column is substituted for an aged one. The elution time drift can lead to the situation that the scheduled windows are no longer aligned with the actual elution times of the analytes, and the collected data are therefore not representative of the abundance of the targeted analytes. This problem has led to the development of a number of methods to try to correct for elution time drift. In general, these methods rely on the characterization of the elution times of a set of known retention time (RT) standards. These compounds have a wide range of hydrophobicities, such that their elution times span the range of elution times for the analytes of interest. During an analytical experiment, the instrument is directed to periodically monitor for the presence of one or more of the RT standards. When a standard is positively identified, its elution time can be compared to a previous control experiment, and a set of associated analyte windows can be suitably adjusted.

Various implementations of this idea can be found in the literature. For example, Lemoine teaches how to trigger a group of MRM transitions when at least one transition from a RT standard compound is identified. (WO2017093861A1) Sanghvi (Sanghvi et. al., "Demonstration of automated on-the-fly retention time updating and SRM method visualization for targeted peptide quantitation". Proceedings of the 64$^{th}$ ASMS Conference on Mass Spectrometry and Allied Topics. San Antonio, Texas, Jun. 5-9, 2016.) has published on a similar method, but did not disclose the details of how the retention time windows are shifted when the RT standards are identified. A different method is proposed by Gallien (MCP 2015 Jun. 14 (5): 1630-1644) in which RT standards are associated with their respective MS-2 spectra wherein the instrument periodically acquires MS-2 spectra for one or more RT standards and, upon positive identification of a standard, scans for associated peaks that can be triggered. In another method, Bailey (J. Proteome Res. 2014, 13, 2152-2161) describes how an initial survey experiment may characterize the elution times of the analytes of interest, which may then be ranked by their elution order. According to Bailey's method, a map of MS-1 features versus peptide elution order is constructed, such that when a set of MS-1 peaks are identified to within a certain tolerance, the instrument triggers scans for all analytes with nearby elution orders. Finally, another method was proposed by Coon (U.S. Pat. No. 9,625,470 B2), in which a peak in an MS-1 scan is identified, the instrument triggers a set of scans of related peaks, for example peaks that are related to the peak in the MS-1 scan by the addition of a tag or isotopic shift. While all these methods have their utility for solving the problem of elution time drift in targeted LCMS, they share one or more of the following disadvantages: logistical complexity in the form of requiring the identification of specific RT standards or peaks, their associated elution times, and MS-1 or MS-2 spectra (Lemoine, Gallien, Bailey, Coon); the requirement to purchase and spike RT standard compounds into each sample (Lemoine, Gallien); and a dependence on accurate m/z measurements (Bailey, Coon).

SUMMARY

Improved methods for determining and correcting retention time shift and drift are described, in which one or more MS-1 spectra are used to identify a corresponding most probable elution time, after which the scheduled retention times of associated analytes may be appropriately adjusted. This method solves the aforementioned disadvantages of the currently known methods, in that the logistical complexity is significantly reduced, there is no requirement to purchase and spike in RT standards (although this may be done if desired), and the method is amenable to nominal mass accuracy and resolution analysis. In some embodiments, the method is extended to also correct for instrumental m/z drift. The methods in accordance with the present teachings provide for maximum sensitivity and throughput, while also allowing the use of very narrow analysis windows for a very large number of compounds.

The proposed method is designed for instruments capable of a full MS mode of operation, in which the following relation is satisfied: $dt \ll t_{dwell}$, where $t_{dwell}$ is dwell time and dt is the incremental time that is allotted to a mass increment. Dwell time is the time during which a precursor is allowed to pass through the system and be accumulated, so-called because the various electronic voltage states "dwell" at a particular setting for a precursor before being switched to the voltage state appropriate for the next precursor. "Dwell time" is synonymous with the term "injection time". Stated differently, this condition requires that the incremental time required to analyze an increment of m/z is much smaller than the dwell time. Examples of instruments capable of a full MS mode are quadrupole ion traps (QIT), Orbitrap™-type electrostatic trap mass analyzers, and time-of-flight (TOF) mass spectrometer instruments.

Accordingly, a method for acquiring Liquid Chromatography Mass Spectrometry (LC-MS) data for a plurality of analytes within a sample comprises: (i) performing a control LC-MS analysis of a plurality of analytes within a control sample, thereby generating control data; (ii) determining chromatographic retention times of one or more of the plurality of analytes within the control sample based on the control data; (iii) choosing a chunk size of the control data, the chunk size comprising a range, $\Delta_{RT}$, of retention times and a range, of $\Delta_{m/z}$ of mass-to-charge values; (iv) choosing a chunk of the control data (control chunk) comprising the chunk size; (v) storing a set of data that includes the at least one control chunk; (vi) scheduling tentative retention time windows for the plurality of analytes within the sample based on the control data, each tentative retention time window comprising a time during which at least one signal that corresponds to an analyte is to be measured, each retention time window comprising a respective start time and a respective stop time; (vii) performing at least a portion of an LC-MS analysis of the sample, thereby generating a sample chunk of LC-MS data, the sample chunk comprising a range of retention times that is less than $\Delta_{RT}$; (viii) calculating a cross-correlation function between the sample chunk and the control chunk; and (ix) modifying one or more of the tentative retention time windows based on results of the cross-correlation calculation.

BRIEF DESCRIPTION OF THE DRAWINGS

The above noted and various other aspects of the present invention will become apparent from the following description which is given by way of example only and with reference to the accompanying drawings, not necessarily drawn to scale, in which.

DETAILED DESCRIPTION

Figure 1A:
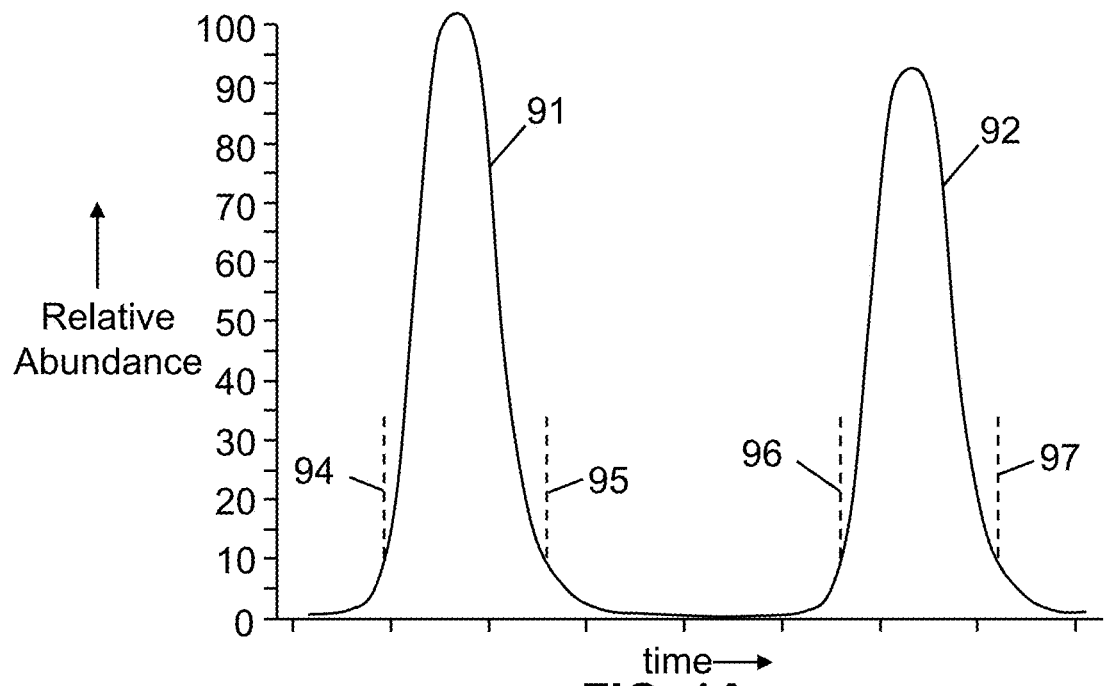
FIG. 1A is a schematic graph of ion signal versus retention time during the hypothetical elution of two analytes of interest during the course of a Liquid Chromatography/Mass Spectrometry (LC-MS) experimental run.

The following description is presented to enable any person skilled in the art to make and use the invention and is provided in the context of a particular application and its requirements. Various modifications to the described embodiments will be readily apparent to those skilled in the art and the generic principles herein may be applied to other embodiments. Thus, the present invention is not intended to be limited to the embodiments and examples shown but is to be accorded the widest possible scope in accordance with the features and principles shown and described. To fully appreciate the features of the present invention in greater detail, please refer to FIGS. 1-9, which are to be considered in conjunction with the following description.

In the description of the invention herein, it is understood that a word appearing in the singular encompasses its plural counterpart, and a word appearing in the plural encompasses its singular counterpart, unless implicitly or explicitly understood or stated otherwise. Furthermore, it is understood that, for any given component or embodiment described herein, any of the possible candidates or alternatives listed for that component may generally be used individually or in combination with one another, unless implicitly or explicitly understood or stated otherwise. Moreover, it is to be appreciated that the figures, as shown herein, are not necessarily drawn to scale, wherein some of the elements may be drawn merely for clarity of the invention. Also, reference numerals may be repeated among the various figures to show corresponding or analogous elements. Additionally, it will be understood that any list of such candidates or alternatives is merely illustrative, not limiting, unless implicitly or explicitly understood or stated otherwise.

Unless otherwise defined, all other technical and scientific terms used herein have the meaning commonly understood by one of ordinary skill in the art to which this invention belongs. In case of conflict, the present specification, including definitions, will control. As used herein, the term "scan", when used as a noun, means a mass spectrum, regardless of the type of mass analyzer used to generate and acquire the mass spectrum. When used as a verb herein, the term "scan" refers to the generation and acquisition of a mass spectrum by a method of mass analysis, regardless of the type of mass analyzer or mass analysis used to generate and acquire the mass spectrum. As used herein, the term "full scan" refers to a mass spectrum than encompasses a range of mass-to-charge (m/z) values that includes a plurality of mass spectral peaks. As used herein, the term "MS-1" refers to either a mass spectrum or the generation and acquisition of a mass spectrum that pertains to ions received by a mass analyzer from an ion source, including any ions that may have been modified from their initial states by in-source fragmentation. As used herein the term "MS-2" refers to either tandem mass spectrometry or a result obtained by the technique of tandem mass spectrometry.

It will be appreciated that there is an implied "about" prior to the quantitative terms mentioned in the present description, such that slight and insubstantial deviations are within the scope of the present teachings. In this application, the use of the singular includes the plural unless specifically stated otherwise. Also, the use of "comprise", "comprises", "comprising", "contain", "contains", "containing", "include", "includes", and "including" are not intended to be limiting. As used herein, "a" or "an" also may refer to "at least one" or "one or more." Also, the use of "or" is inclusive, such that the phrase "A or B" is true when "A" is true, "B" is true, or both "A" and "B" are true.

Figure 1B:
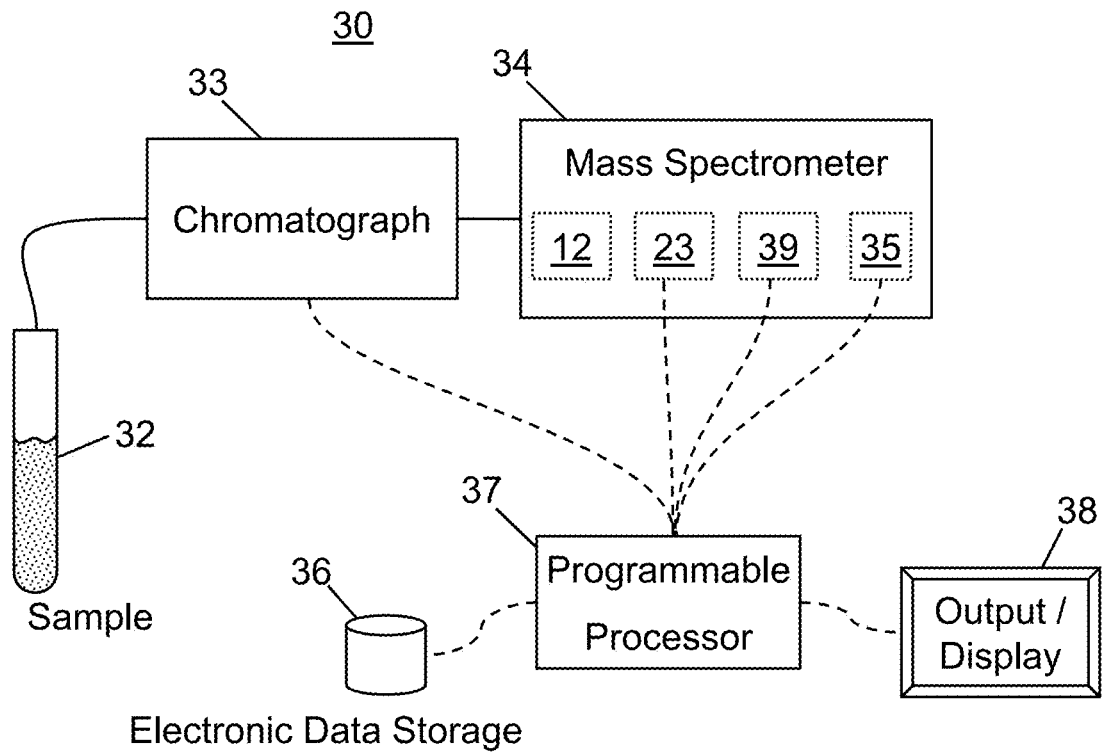
FIG. 1B is a schematic diagram of a general system for generating and automatically analyzing liquid chromatography/mass spectrometry data.

FIG. 1B is a schematic example of a general system 30 for generating and automatically analyzing chromatography/mass spectrometry spectra as may be employed in conjunction with the methods of the present teachings. A chromatograph 33, such as a liquid chromatograph, high-performance liquid chromatograph or ultra-high-performance liquid chromatograph receives a sample 32 of an analyte mixture and at least partially separates the analyte mixture into individual chemical components, in accordance with well-known chromatographic principles. The resulting at least partially separated chemical components are transferred to a mass spectrometer 34 at different respective times for mass analysis. As each chemical component is received by the mass spectrometer, it is ionized by an ionization source 12 of the mass spectrometer. The ionization source may produce a plurality of ions comprising a plurality of ion species (i.e., a plurality of precursor ion species) comprising differing charges or masses from each chemical component. Thus, a plurality of ion species of differing respective mass-to-charge ratios may be produced for each chemical component, each such component eluting from the chromatograph at its own characteristic time. These various ion species are analyzed-generally by spatial or temporal separation—by a mass analyzer 39 of the mass spectrometer and detected by a detector 35. As a result of this process, the ion species may be appropriately identified according to their various mass-to-charge (m/z) ratios. As illustrated in FIG. 1B, the mass spectrometer comprises a reaction cell 23 to fragment or cause other reactions of the precursor ions, thereby generating a plurality of product ions comprising a plurality of product ion species. It should be noted that the m/z and retention time correction methods taught herein may be advantageously used in conjunction with the processing of either MS-1 spectra (spectra of non-fragmented ion species) or MS-2 spectra (spectra of fragment ions).

Still referring to FIG. 1B, a programmable processor 37 is electronically coupled to the detector 35 of the mass spectrometer and receives the data produced by the detector 35 during chromatographic/mass spectrometric analysis of the sample(s). The programmable processor 37 may comprise a separate stand-alone computer or may simply comprise a circuit board or any other programmable logic device operated by either firmware or software. Optionally, the programmable processor may also be electronically coupled to the chromatograph 33 and to other various components of the mass spectrometer in order to transmit electronic control signals to one or the other of these instruments so as to control their operation. The nature of such control signals may possibly be determined in response to the data transmitted from the detector to the programmable processor or to the analysis of that data as performed by a method in accordance with the present teachings. The programmable processor may also be electronically coupled to a display or other output 38, for direct output of data or data analysis results to a user, or to electronic data storage 36. The programmable processor shown in FIG. 1B is generally operable to: receive a precursor ion chromatography/mass spectrometry spectrum and a product ion chromatography/mass spectrometry spectrum from the chromatography/mass spectrometry apparatus and to automatically perform the various instrument control, data analysis, data retrieval and data storage operations in accordance with the various methods discussed below.

During the course of an LC-MS experimental run, mass spectra are repeatedly obtained as retention time (RT) increases during the course of elution of analytes from a chromatographic column. Consider a targeted experiment in which, in addition to the normal scheduled RT MS/MS windows, a full MS-1 mass spectrum is acquired in accordance with a regular interval, for example every 1 second. The complete set of these inserted MS-1 spectra, which are commonly referred to as "scans", comprises a two-dimensional (2D) data set of retention time and m/z. The period of the full MS scans should be such that 6 or more scans are acquired in a typical LC peak width, which is the Nyquist sampling limit for a Gaussian curve. If the MS spectra are acquired with an irregular period, then, prior to performing the procedures described below, the spectra should be interpolated to a regular grid in which the spacing between spectra is a constant retention-time increment, $\Delta t$.

Figure 2A:
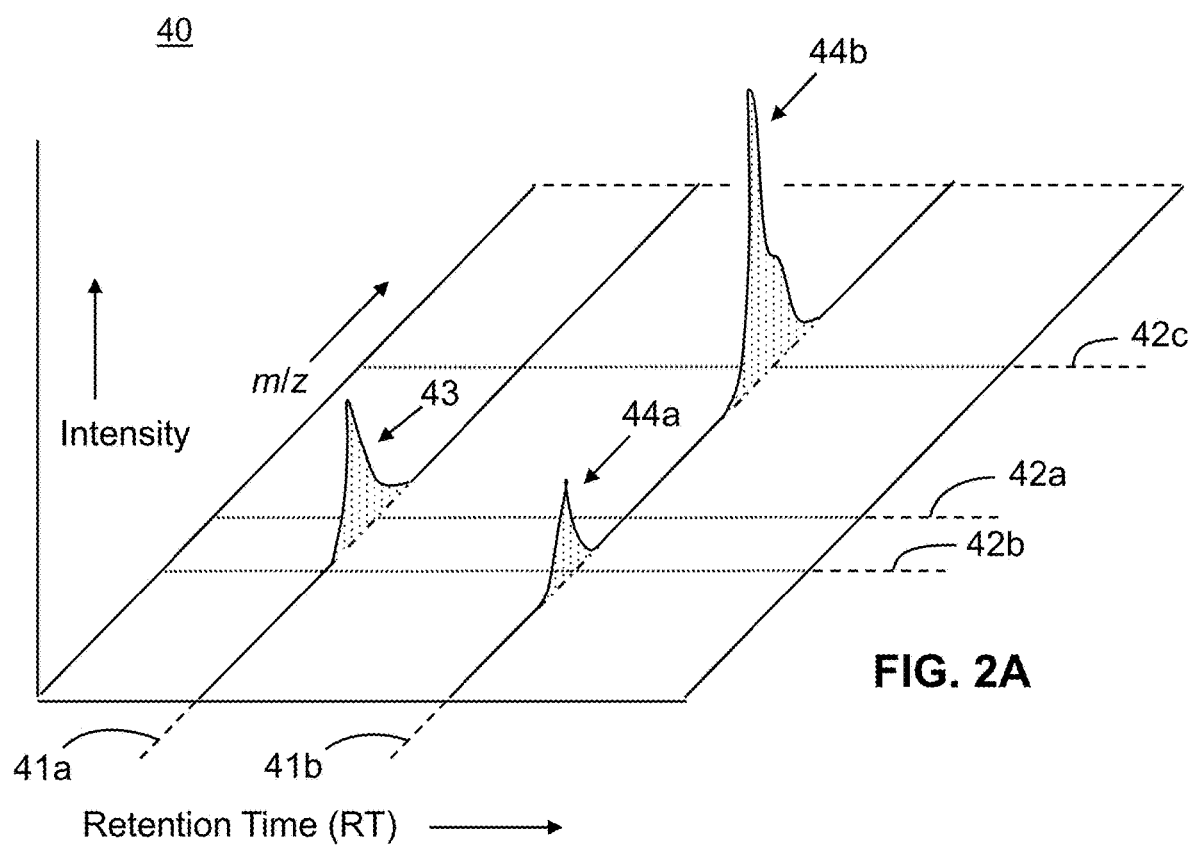
FIG. 2A is a schematic depiction of separate hypothetical mass spectra as might be obtained at two different chromatographic retention times during the course of an LC-MS experimental run, shown as a three-dimensional graph of the intensity of the mass spectral signal plotted versus time and mass-to-charge ratio (m/z) and with mass spectral peaks shaded for clarity.

FIG. 2A is a schematic perspective depiction of hypothetical mass spectra as might be obtained at two different chromatographic retention times during the course of acquiring the additional full MS-1 spectra described above. Although only two mass spectra are illustrated, the entire set of additional MS-1 spectra may comprise a large number of such spectra. Each mass spectrum comprises a set of measured intensities as observed at respective mass-to-charge (m/z) values. Two such mass spectra are illustrated in FIG. 2A. In the hypothetical example, a first mass spectrum is measured at retention time 41a and includes a peak 43 located at a first m/z value 42a. Similarly, a second mass spectrum is measured at retention time 41b and includes a peak 44a at a second m/z value 42b and another peak 44b at a third m/z value 42c. In practice, each full MS-1 mass spectrum may comprise many more peaks.

Figure 2B:
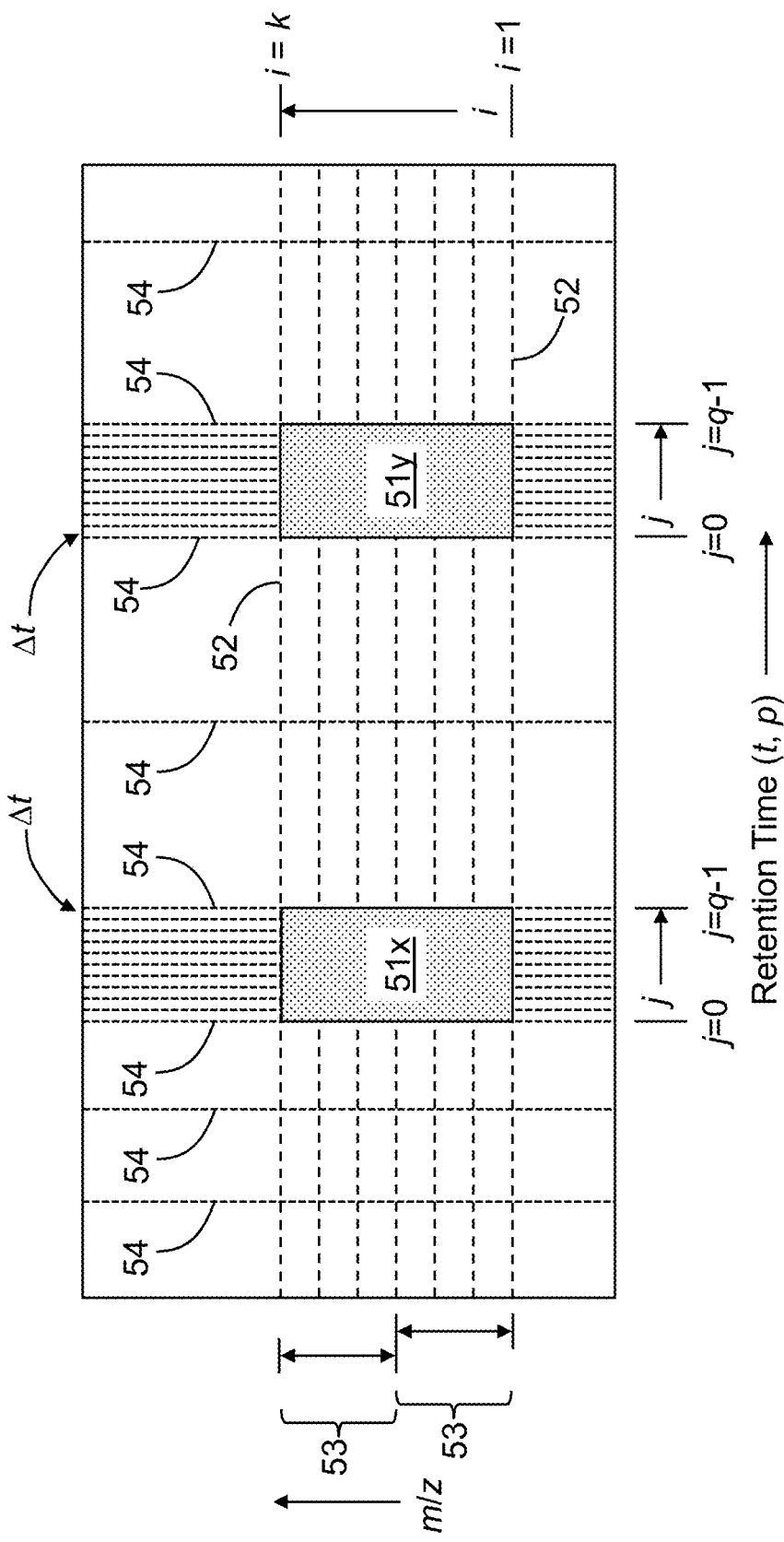
FIG. 2B is a schematic depiction of the locations, in accordance with the present teachings, of various individual mass spectra (scans), groups of mass spectra (chunks), individual m/z channels and groups of m/z channels (bins) during the course of an LC-MS experimental run.

FIG. 2B is a depiction of just the (RT, m/z) "floor" plane of FIG. 2A. In FIG. 2B, the RT values 54 of only a few of the many possible mass spectra are illustrated as dotted vertical lines. Each mass spectrum 54 comprises a plurality of data points, where each data point corresponds to a respective one of a set of m/z channels 52. According to various methods of the present teachings, spectra are considered in "chunks", such as the illustrated test chunk 51x and general chunk 51y, where each chunk is a group of portions of successive mass spectra, each spectral portion comprising a range of m/z values. Letting the total number of mass spectra in a chunk be denoted as q, these q mass spectra are separated by the retention time increment, $\Delta t$, and each individual spectrum in the chunk is identified by the index variable, j, where $0 \leq j \leq (q-1)$. Each spectrum in a chunk comprises a total of k channels 52, which are identified by the index variable, i, where $1 \leq i \leq k$. A few such m/z channels 52 are depicted in FIG. 2B. In some instances, a plurality of adjacent m/z channels within each spectrum may be consolidated (binned) into a single representative channel spanning a range (or bin) 53 of the original channels.

Figure 2C:
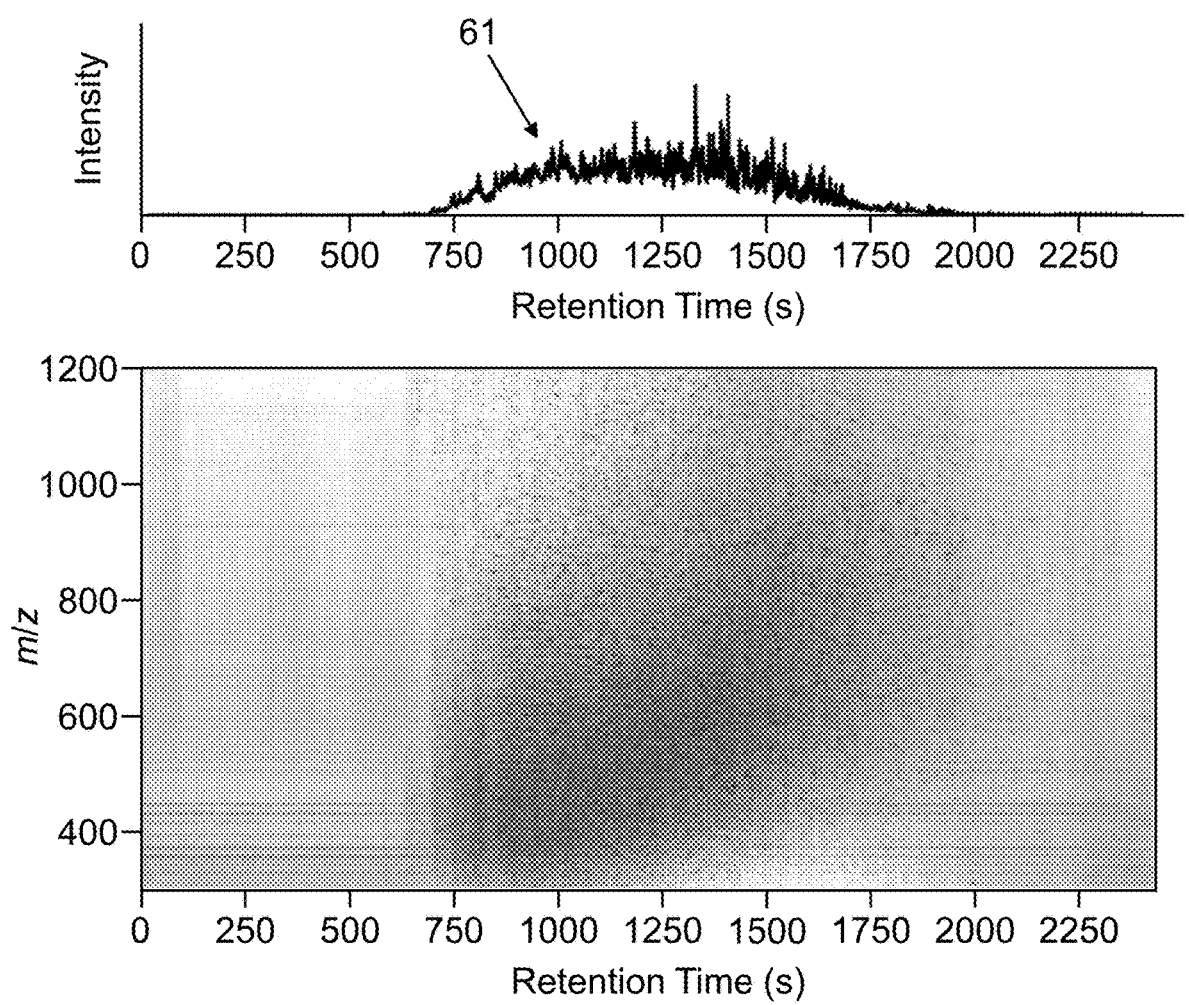
FIG. 2C a diagrammatic representation of the variation of MS-1 mass spectra of a HeLa digest versus liquid chromatograph elution time, with the upper portion of the diagram illustrating a plot of total ion current and the lower portion indicating, by the degree of shading, the apportioning of the mass spectral signal among various mass-to-charge (m/z)

Whereas the intensities of mass spectral peaks are schematically depicted in FIG. 2A, no such intensity data is depicted in FIG. 2B. However, intensity information for actual data may be qualitatively represented in pictorial form by the density of dark dots at each retention time and m/z value. Such a representation of a data set is shown in the bottom portion of FIG. 2C, which shows data obtained by MS analysis of peptides in a background of 200 µg of human cell lysate tryptic digest from the Henrietta Lacks (HeLa) cell line. The upper portion of FIG. 2C is a plot of total ion current versus retention time as measured during the analysis. The total ion current plot provides a quantitative measure of total ion flux at each time but lacks m/z-specific information.

Consider now the uniqueness of a subset of these additional full-MS-1 data; such a subset is herein referred to herein as a "chunk" as noted above with reference to FIG. 2B. For example, a test chunk of q consecutive spectra of k m/z channels starting at time index p can be cross correlated across the entire data set, as in Eq. 1, where: (a) y (t, i) is the mass spectral intensity of the m/z value having index, i, as measured at time, t, where the y (t, i) measurements are made across the entire data set; (b) x (p+j$\Delta t$, i) is the mass spectral intensity of the m/z value of the test chunk having index, i, as measured at time (p+j$\Delta t$); (c) the inner sum is the dot product of a spectrum from y at time t'=t+ (j×$\Delta t$) and a spectrum from x at time p'=p+ (j× $\Delta t$); and (d) the outer sum iterates over the q spectra ("scans") in the test chunk.

$$r(t) = \sum_{j=0}^{q-1} \sum_{i=1}^{k} y(t + j\Delta t, i) x(p + j\Delta t, i) \qquad \text{Eq. 1}$$

Figure 3:
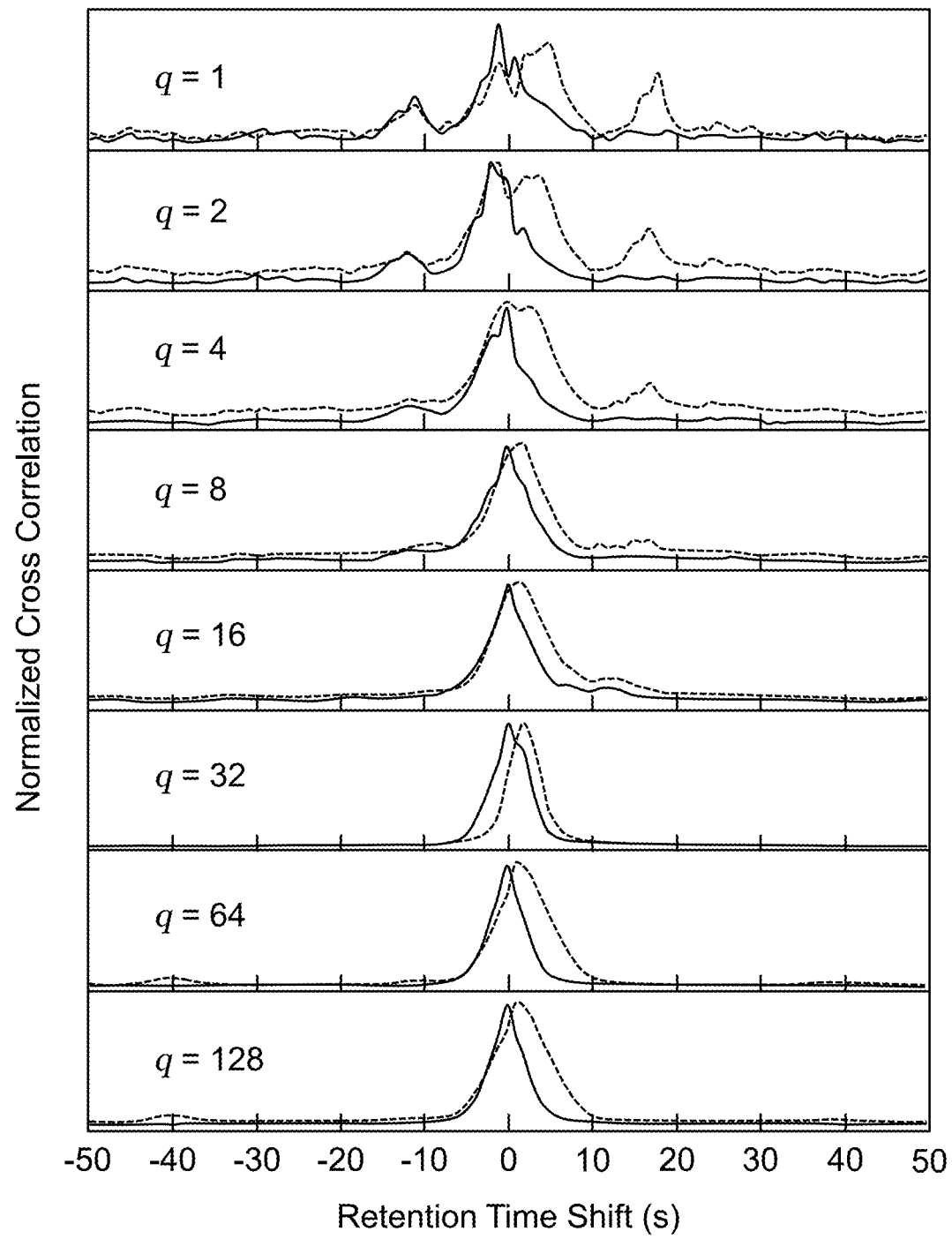
FIG. 3 is a set of autocorrelation results (solid lines) and cross correlation results (dashed lines) of different size test chunks of data from FIG. 2C taken from replicates of a 40-minute LCMS analysis of 200 µg HeLa-lysate digest, wherein the test chunks come from 998 seconds into the run in FIG. 2C.

When both y and x come from the same data set (e.g., no retention time calibration drift), then Eq. 1 is an autocorrelation, examples of which are given by the solid-line traces in FIG. 3 for different chunk sizes, q. When Eq. 1 is evaluated for a general chunk at a retention time, t, at which the mass spectral structure is dissimilar to that of the test chunk, then the result is a number that varies in pseudo-random fashion. Thus evaluation of Eq. 1 at several such retention time values yields an essentially flat baseline. However, when Eq. 1 is evaluated in the vicinity of a chunk at which the mass spectral structure is similar to that of the test chunk, such as in the vicinity of the test chunk itself, then the result is an intense peak that stands out from the baseline.

FIG. 3 is a set of plots of the results of autocorrelation calculations (solid-line traces) and cross correlation calculations (dashed-line traces) using different size test chunks from replicates of a 40-minute LC-MS analysis of 200 µg of the HeLa lysate digest for which data is shown in FIG. 2C. The test chunks come from 998 seconds into the run whose data is depicted in FIG. 2C. As shown by the solid-line traces of FIG. 3, the autocorrelation is characterized by a peak at zero time shift. The width of the autocorrelation peak decreases and its signal to noise ratio (S/N) increases as the chunk size q is increased from 1 to 32, while at larger chunks sizes the peak gets subtly wider. For purposes of this work, S/N as defined by the height of the autocorrelation peak against the high frequency background of the correlation plot. The width and S/N of the autocorrelation peak is indicative of the uniqueness of the test chunk in the data set, and the full width half maximum (FWHM) in the depicted data is about 5 seconds. The results of cross correlation calculations of the first data set with test chunks taken from a replicate data set is shown by solid lines in FIG. 3. The cross correlation peaks are in general somewhat wider than the autocorrelation peaks and are not perfectly centered at 0 time shift, demonstrating that there was some small but non-negligible amount of variability between the data sets.

Figure 4:
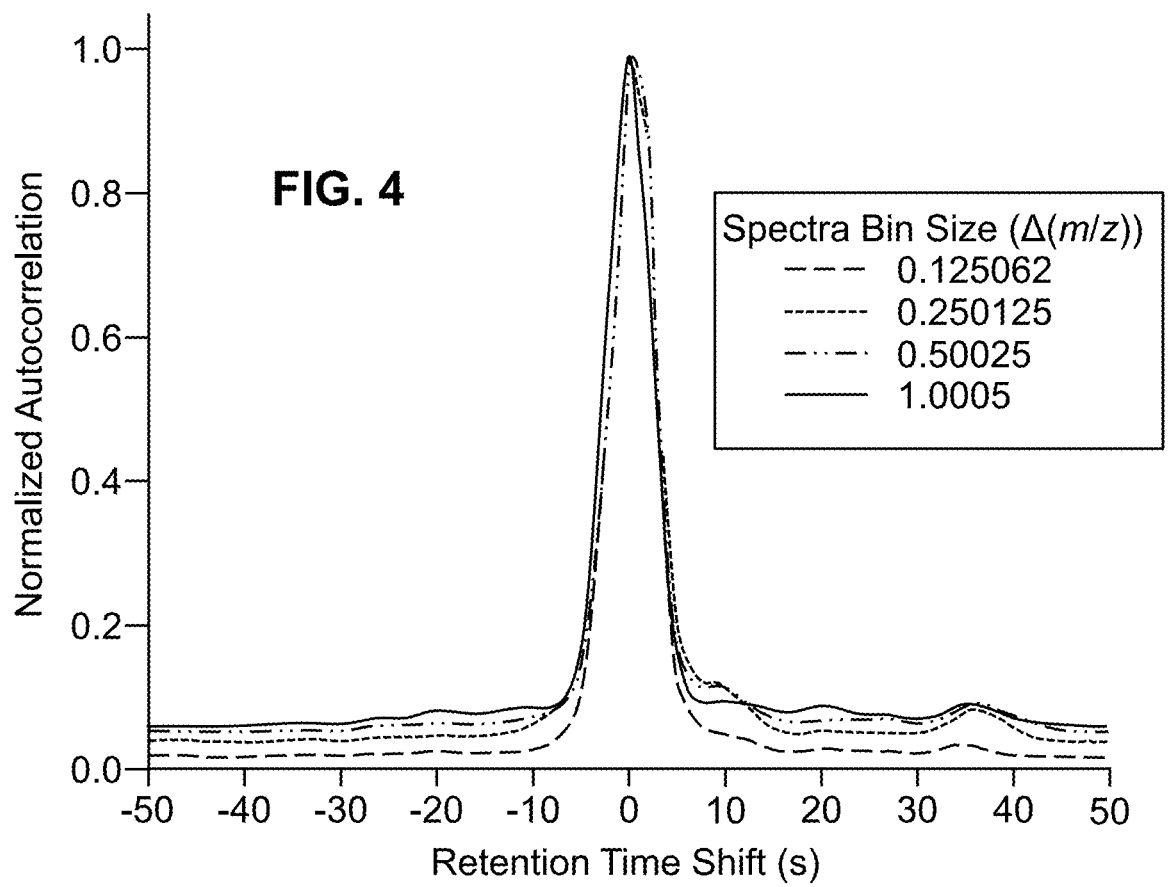
FIG. 4 is a set of autocorrelation results from FIG. 2C data, using chunk size 32 as calculated using the various indicated m/z bin sizes.

The data sets used for illustrating the autocorrelation and cross-correlation calculations comprise full MS-1 spectra that span the m/z range of 300 Da to 1200 Da, because this is the most useful range for the analysis of tryptically digested proteins. The raw spectra were acquired with an m/z step size of 0.033 Da. Thus, if the entire set of spectra were to be stored at all time points, then the file size would be quite large, and the cross correlation could become computationally expensive. This issue can be resolved by compressing the data set. For example, the spectra can be binned to a coarser grid (e.g., at the centers of bins 53 illustrated in FIG. 2B) than the one at which the data were originally acquired. FIG. 4 shows a set of plots of autocorrelation calculations using the HeLa data of FIG. 2C using the listed m/z bin sizes and chunks of size q=32. The results indicate that the binning has minimal effect on the position and width of the autocorrelation peak (FIG. 4). Although the autocorrelation peak becomes slightly broader and has worse S/N as the bin size increases, the test chunks of sizes q=8 to q=32 are still quite distinguishable from general chunks of the data at other retention times. These results highlight the fact that the mass measuring resolution does not need to be extremely high to yield unique correlation chunks.

The data could be further compressed by identifying m/z channels which are not very informative (for example, not sufficiently discriminatory), and omitting them from the data set. One possible procedure would be to omit certain m/z channels and measure the effect this has on the cross correlation data. If the correlation peaks are not significantly altered by the omission of certain m/z channels, then it is safe to remove them. If this procedure is able to identify a minimal set of SIM scans that could uniquely identify retention times, they could take the place of the additional full MS-1 scans and all the techniques in this disclosure could be applied to mass spectral instruments that either do not have full-scan capability or for which full-scan measurements are slow or inconvenient. Other advanced techniques could be used to compress the MS-1 scans, such as averaging, wavelet compression, or singular value decomposition of the control data to yield a set of most significant eigenvectors, which can map the MS-1 spectra to a reduced set of dimensions that still maintain much of the uniqueness of the original dimensions.

The procedure described in Eq. 1 and for which results are demonstrated in FIGS. 3 and 4 can be applied at all times across an entire LC-MS experiment, such as the experiment depicted in FIG. 2C. The chromatography method of that experiment used a ramp of the acetonitrile mobile phase from 2% to 35%, where the remaining fraction of the mobile phase was water (gradient A in FIG. 5). One salient feature of the presently disclosed methods is that the uniqueness of the test chunks depends somewhat on the nature of the matrix in which the sample is carried. For samples such as tryptic HeLa digest or, indeed, for a majority of assays, the sample matrix is likely unique enough to locate a suitably large test chunk to within several seconds of the control time of an analyte. However, for very clean samples, it may be necessary to introduce RT standard compounds into the matrix, as many of the methods in the art do. However, the methods in accordance with the present teachings differ from the conventional RT calibration methods in that, by employing the methods of the present teachings, one does not need to explicitly identify each RT standard and its elution time or characteristic MS-1 or MS-2 spectral features.

When the data set from FIG. 2C is correlated with itself at each retention time, the result is a peak centered at zero time shift at each retention time across the entire experimental run (depicted as a dark horizontal black band in FIG. 6A), although the RT periods between 0 and 600 seconds and from 2200 to 2400 seconds are not very unique. The spectra during these periods contain background species at a nearly constant abundance, and therefore these periods have autocorrelation peaks with relatively poor S/N. It is evident that the experimenter should generally take care in making inferences about retention time shifts during such periods. Nonetheless, there are no analytes eluting during these periods either. When the data from FIG. 2C is correlated at each retention time with data from a replicate LCMS experiment having the same LC gradient parameters, the result is similar to the autocorrelation, only there is slightly more variability in the position of the correlation peak (FIG. 6B). However, if the LC gradient conditions are changed, for example by ramping from 2% to 22% acetonitrile (gradient B in FIG. 5) instead of 2% to 32%, then the result is a shift to later analyte retention times. When the data from the gradient A experiment are correlated with the gradient A' experiment (see FIG. 5), then the maxima of the cross correlations form a line from near zero time shift at a retention time of 600 seconds to a shift of around-200 seconds at a retention time of 2400 seconds (FIG. 6C). The movement of the positions of the maxima of the cross correlation calculations to negative time shifts is a demonstration that, although the same compounds are eluting in the two experiments, they elute earlier in the gradient A experiment relative to the gradient A' experiment. The same procedure was performed with gradients B and B' (FIGS. 6D and 6E). Although there is a clear trend line in all of these data sets, there are regions where the cross correlation peak has lower S/N than in other regions. In such regions of the data, a judgement must be made about whether the information in the cross correlation is actionable or not. Such considerations are less important when the procedure is applied to replicate runs with the same gradient, where the retention time drifts are on the order of seconds instead of minutes.

Figure 5:
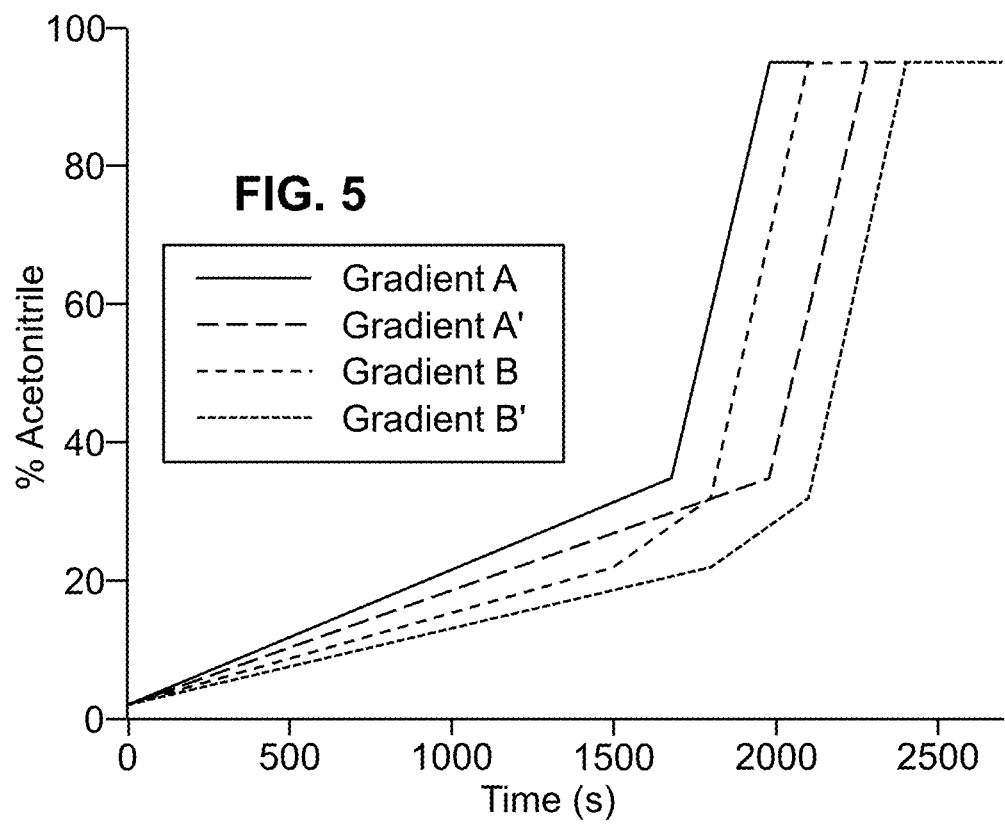
FIG. 5 is a set of plots of various different liquid chromatograph gradient programs that were used in the experiments described in the text.
Figure 6A:
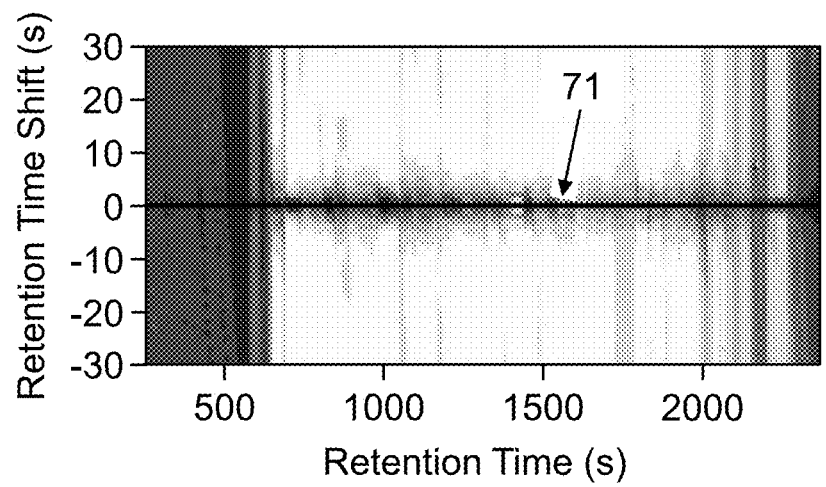
FIG. 6A is a graphical depiction of the correlation, as indicated by the depicted shading levels in which darker shading represents greater values of the cross correlation profile, of the mass spectral data of FIG. 2C with itself, with the liquid chromatograph gradient parameters during collection of the data described by profile A of FIG. 5.
Figure 6B:
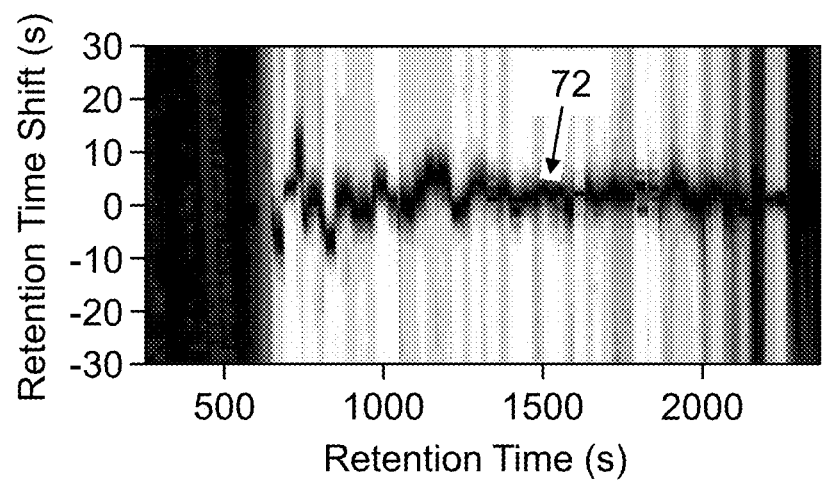
FIG. 6B is a graphical depiction of the correlation, as indicated by the depicted shading levels in which darker shading represents greater values of the cross correlation profile, between the mass spectral data of FIG. 2C and data obtained from a replicate LCMS experiment having the same liquid chromatograph gradient parameters (profile A of FIG. 5) as used in the experiment whose results are shown in FIG. 3.
Figure 6C:
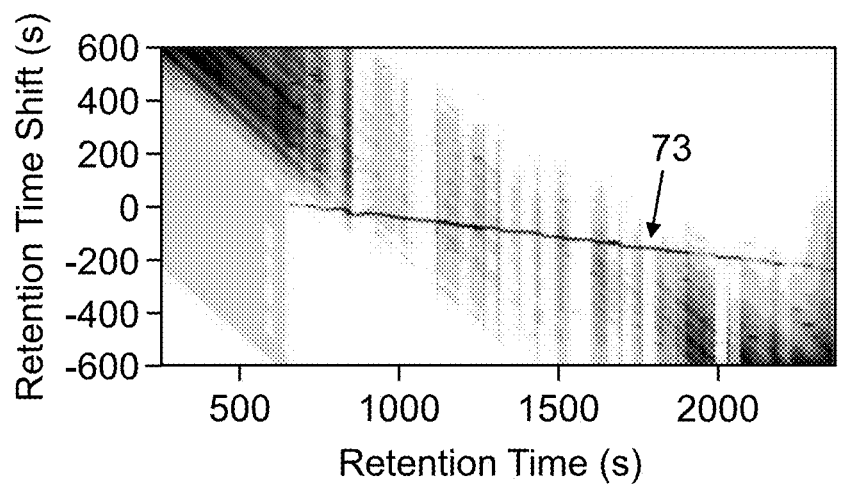
FIG. 6C is a graphical depiction of the correlation, as indicated by the depicted shading levels in which darker shading represents greater values of the cross correlation profile, between the mass spectral data of FIG. 2C and data obtained from an LCMS experiment employing liquid chromatograph gradient parameters as described by profile A' of FIG. 5.
Figure 6D:
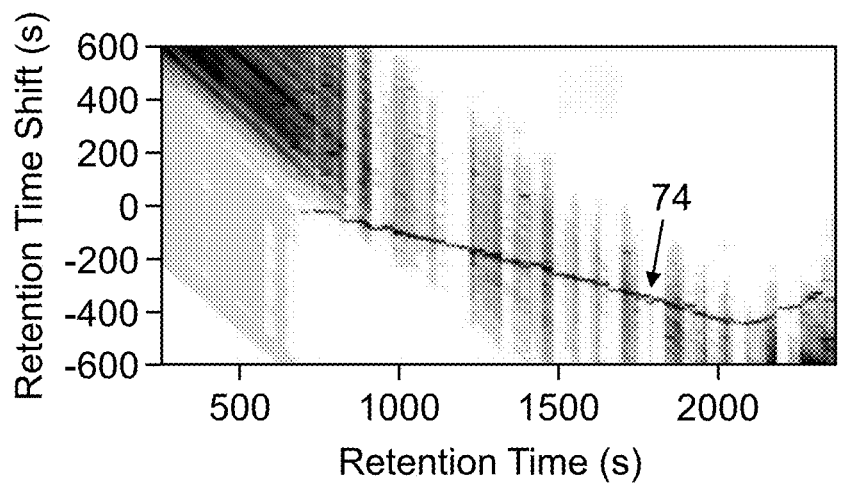
FIG. 6D is a graphical depiction of the correlation, as indicated by the depicted shading levels in which darker shading represents greater values of the cross correlation profile, between the mass spectral data of FIG. 2C and data obtained from an LCMS experiment employing liquid chromatograph gradient parameters as described by profile B of FIG. 5.
Figure 6E:
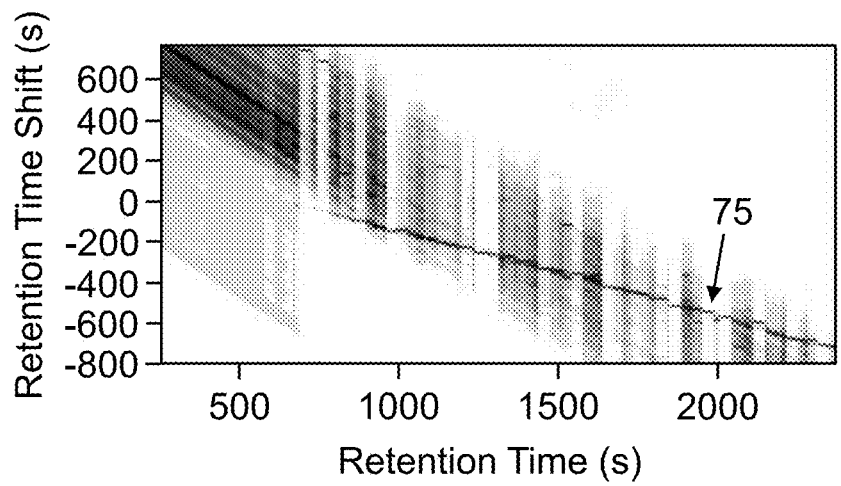
FIG. 6E is a graphical depiction of the correlation, as indicated by the depicted shading levels in which darker shading represents greater values of the cross correlation profile, between the mass spectral data of FIG. 2C and data obtained from an LCMS experiment employing liquid chromatograph gradient parameters as described by profile B' of FIG. 5.
Figure 7:
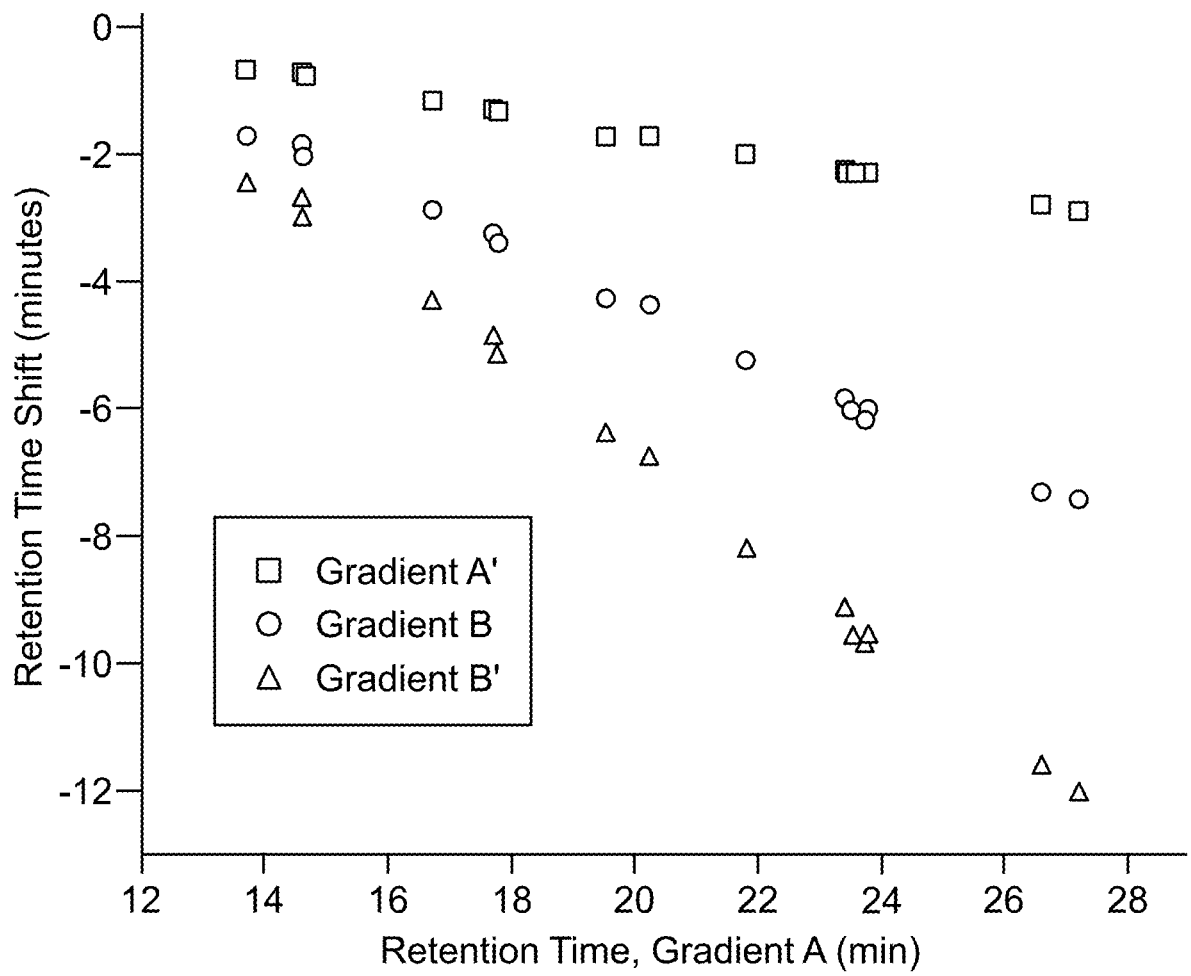
FIG. 7 is a plot of the observed retention times of Pierce Retention Time Calibration standards for replicate experiments employing various LC gradient programs (profiles depicted in FIG. 5), subtracted from the respective retention times of the standards as observed in an experiment employing gradient profile A.

To further corroborate the results of FIGS. 6A-6E, the data sets were collected in replicates of 3 for each of the gradients depicted in FIG. 5, and the retention times of 15 spiked-in standard peptides (Pierce Retention Time Calibration mixture) were measured. The results of these measurements are shown in FIG. 7. The results show that the average retention times of the standards relative to the gradient A retention times are shifted by up to 12 minutes in the worst case, and in each case correspond to the shifts in their respective cross correlation data sets in FIGS. 6A-6E.

Figure 9:
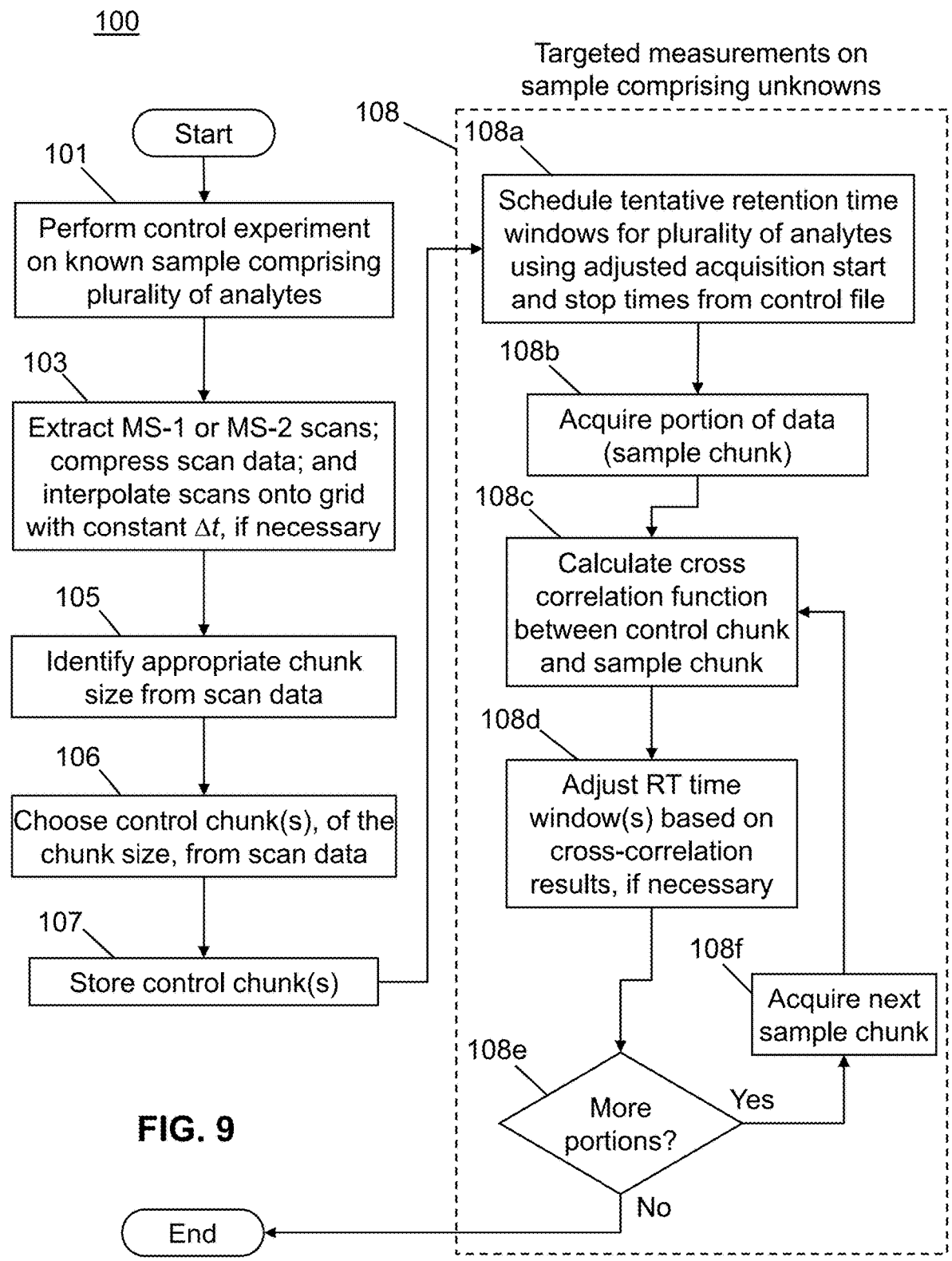
FIG. 9 is a flow diagram of a method in accordance with the present teachings.

Procedures for adjusting retention times based on cross correlation data of the type discussed above are now described and are outlined as method 100 in FIG. 9. Initially, for any particular set of analytes of interest, a user specifies runtime RT windows for each analyte of interest and performs a control experiment (step 101) to collect a data set (e.g., as in FIG. 2C). At this stage, the user may schedule the runtime RT windows manually. However, in a later section of this document, we describe a method for determining these runtime RT windows automatically during subsequent experiments on samples. The purpose of these scans is to determine the elution time of the analytes, making use of spectral library peak information to unequivocally identify as many of the analytes as possible. For the latter purpose, the method should additionally contain either unscheduled Parallel Reaction Monitoring MS-2 measurements for the analytes of interest, and/or Data-Independent MS-2 measurements. The MS-2 data then may be compared to either experimental or in silico spectral libraries, many of which are available for common biochemical analytes of interest.

Next (step 103), the MS-1 scans from the control experiment are extracted, compressed in a suitable manner, interpolated to a constant retention-time increment, Δt (such as Δt=1 second) if necessary, and saved to a file. The chunk size that allows the analyst to uniquely identify all retention times may also be determined (for instance, by trial and error) in step 105. In step 106, one or more chunks of the control data are determined, each such chunk comprising the chunk size. In this document, a chunk or chunks of the control data are referred to as a "control chunk" or "control chunks", respectively. Preferably, the chosen chunk size encompasses the entire data set generated by a control experiment. In some instances, a chunk of the control data may comprise only a subset of the entire data set. This may be done, for example, in order to save computer memory storage or disc storage space. In such cases, a control chunk may be centered about an expected retention time and each control chunk may correspond to a respective retention time window in a subsequent analysis of a sample. The one or more control chunks and/or a representation of the chunk size and chunk position(s) are then stored in step 107. Alternatively, the entire data set may be stored together with a representation of the positions of the one or more chunks of control data within the data set. This stored file thus becomes associated with future acquisitions of the analytes of interest.

Step 108 and its associated sub-steps (108a-108g) outline the procedure for performing a set of targeted MS-2 measurements of a plurality of analytes in an "unknown" sample (i.e., a sample in which one or more specific analytes are tentatively expected to be present but for which the analyte quantities, if any are present in the sample, are unknown). The first step in running the analysis of the sample (step 108a) is to specify and schedule tentative retention time windows for the plurality of analytes using the data from the control file as an initial calibration. Suitable start and stop times to complete the scheduled retention time window specifications can be determined by characterizing the width of the autocorrelation peaks as a function of time. For example, if the half width half maximum of the autocorrelation peak at time t is w, the retention time windows could be specified as $t_{start}=t-\alpha_w$ and $t_{stop}=t+\alpha w$, where α is a constant such as 2.0. Subsequently, data acquisition starts at time zero and a first portion of the data is acquired (step 108b), using the initially scheduled windows. Each such portion of the data is herein referred to as a "sample chunk". The number of mass spectra encompassed by a sample chunk, where each such spectrum corresponds to a respective retention time, should be fewer than the number of mass spectra composing control chunk. A cross-correlation function, preferably either r (t) in the form of Eq. 1 or r (t,m) in the form of Eq. 5 (discussed below) is calculated between the first sample chunk and an appropriate control chunk in step 108c. For example, if the data portion corresponds to or is close to a particular retention time window, then a control chunk that corresponds to or that is close to the same retention time window may be the most appropriate control chunk, if such is available. The result of the cross correlation function calculation may be used to estimate the current retention time shift of the experiment with respect to the control experiment.

The cross correlation function calculation may be performed as a one-dimensional calculation of according to either Eq. 1 or, alternatively, in accordance with the two-dimensional cross-correlation calculation scheme based on Eq. 5, the latter of which is discussed further below. When the one-dimensional cross-correlation function is calculated, the symbols in Eq. 1 are defined as follows: y (t, i) is the mass spectral intensity of the m/z value of the control chunk having index, i, as measured at time, t; x (p+jΔt, i) is the mass spectral intensity of the m/z value of the sample chunk having index, i, as measured at time (p+jΔt); k is the number of m/z values in both the sample chunk and the control chunk; q is the number of mass spectra in the sample chunk; and p is a time index of a first mass spectrum of the sample chunk.

If the cross correlation indicates that a retention time adjustment is required, then the current retention time shift can be adjusted (step 108d) and the adjustment associated with retention time windows for which data has not yet been acquired (if any), shifting those windows by an appropriate amount. If there are more data portions (e.g., retention time windows) to be analyzed, as determined in the decision step 108e, then a next data portion is acquired in step 108f and execution of the method 100 returns to step 108c. Otherwise, if there are no remaining un-interrogated retention time windows or data portions, the "No" branch of step 108e is executed and method 100 terminates.

As an example algorithm for determining which scheduled scans are active at any time, consider a function $\delta$ (r (t'$_n$)) that estimates the retention time shift from the cross correlation function r at time t'$_n$. The time base t is the estimated time in the control experiment, as opposed to the actual elapsed time in the current experiment. In Eq. 2a, a prospective time t'$_n$ is given by the previous time value $t_{n-1}$ plus the time increment since the last calculation, δt. The prospective time is then corrected by $\delta$ (r (t'$_n$)) in Eq. 2b.

$$t'_n = t_{n-1} + \delta t \qquad \text{Eq. 2a}$$

$$t_n = t'_n + \delta(r(t'_n)) \qquad \text{Eq. 2b}$$

With an estimate for $t_n$, the set of g active scans can be determined in the normal manner, as the scans that have a starting and ending time that bracket $t_n$, as in Eq. 3.

$$S(t_n) = \{s_1, s_2, \ldots, s_g : t_{start}(s_i) \geq t_n \cap t_{stop}(s_i) \leq t_n\} \qquad \text{Eq. 3}$$

The estimated time shift $\delta$ (r (t'$_n$)) could be either accepted or possibly rejected based on the quality of the data in r (t'$_n$). For example, a peak signal to noise or other quality metric Q (r (t'$_n$)) and/or full width at half maximum metric W (r (t'$_n$)) could be used to accept or reject the estimation, defaulting to a time shift, for example the last 'good' time estimate, if outside of a tolerance. Additionally, time shifts that are thought to be larger than expected, and therefore spurious, could be rejected. The current retention time shift may also be accumulated with an exponential filter to buffer out fluctuations in the estimation procedure. The history of retention time shifts Δ could be fit to a line or other equation to make another prediction P (Δ, t'$_n$) of the current time shift, and the estimated time shift could be compared with this prediction, and rejected if the difference was too large. A possible set of considerations for accepting or rejecting the estimated time shift $\delta$ (r (t'$_n$)) are summarized below:

$$\delta(r(t'_n)) = \begin{cases} Q(r(t'_n)) < q_{tol} \to 0 \\ W(r(t'_n)) > w_{tol} \to 0 \\ |\delta(r(t'_n))| > \delta_{max} \to 0 \\ |\delta(r(t'_n)) - P(\Delta, t'_n)| > \delta_p \to P(\Delta, t'_n) \\ \text{else} \to \delta(r(t'_n)) \end{cases} \quad \text{Eq. 4}$$

where P ( ) is updated with each iteration.

The control data set comprising MS spectra on a fixed time grid is a rich source of information, and in addition to estimating retention time shifts, it is also possible to estimate mass-to-charge (m/z) shifts of spectra relative to the control experiment spectra. One conceptually simple way to do this is by correlating the chunk of spectra with the control data set in two dimensions instead of just one, as in Eq. 5.

$$r(t, m) = \sum_{j=0}^{q-1} \sum_{i=1}^{k} y(t + j\Delta t, m + i) x(p + j\Delta t, i) \quad \text{Eq. 5}$$

Figure 8A:
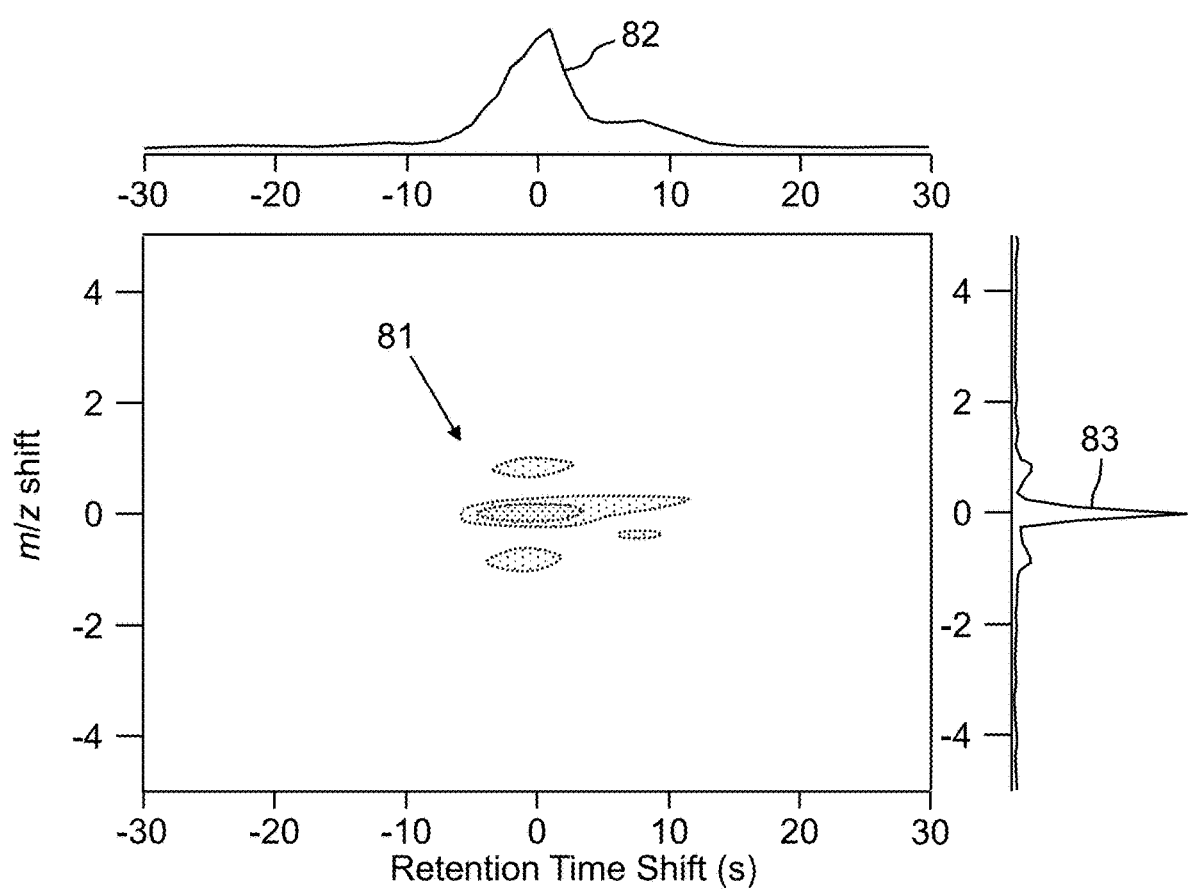
FIG. 8A is a two-dimensional convolution of LCMS experimental data with itself, wherein the magnitude of the convolution is indicated by the depicted shading levels and wherein the data was obtained from an LCMS experiment employing liquid chromatograph gradient parameters as described by profile A of FIG. 5.
Figure 8B:
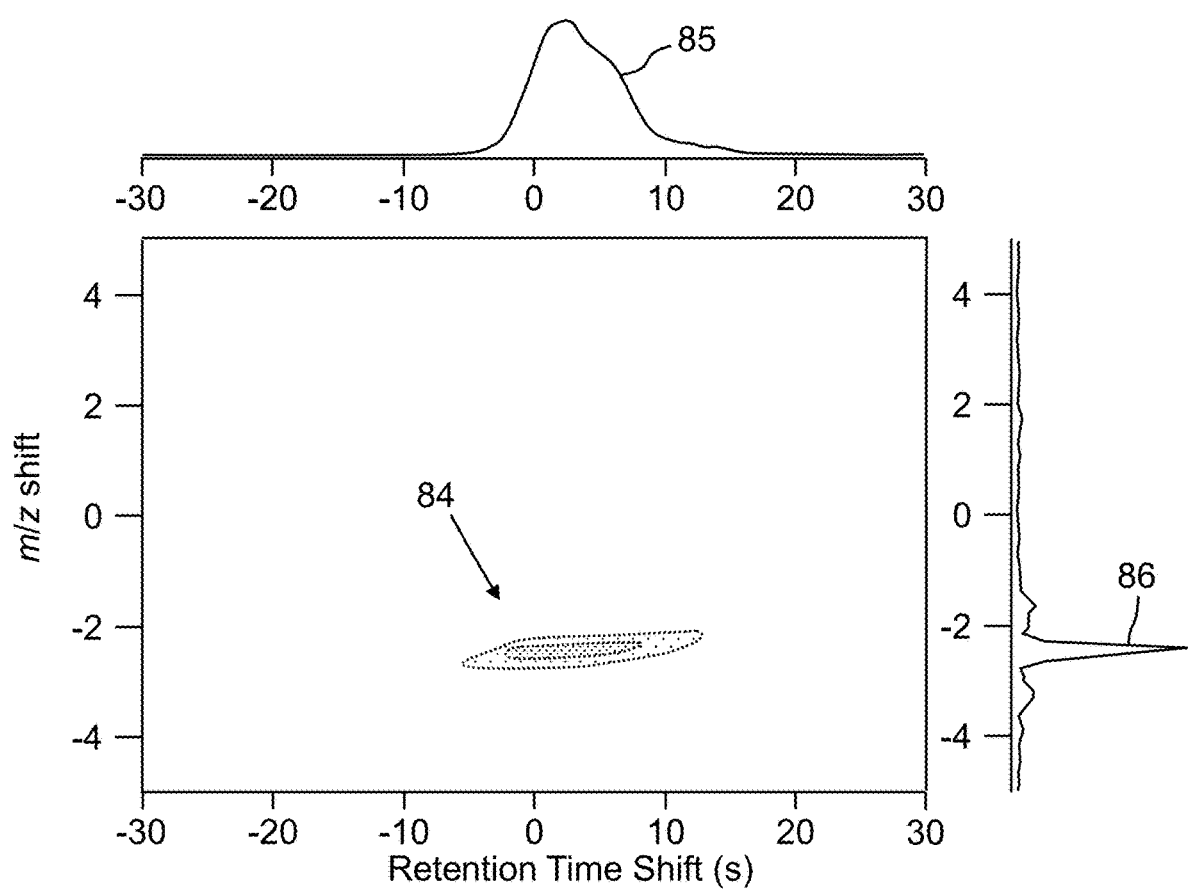
FIG. 8B is a two-dimensional convolution of LCMS experimental data obtained during a second mass spectral analysis of the sample of FIG. 8A using instrument calibration parameters modified in accordance with the present teachings, wherein the magnitude of the convolution is indicated by the depicted shading levels and wherein the modification consisted of shifting the m/z values of the data by ~2 Da.

This is a very important and well-known computation in digital signal processing. The most efficient techniques to carry out the computation of Eq. 5 make use of the Fourier Transform (FT) convolution property, through which two signals can be convolved in O (n log n) time instead of O ($n^2$) time, where n represents the number of m/z data points in a mass spectrum. Convolution and correlation are the same basic processes, except that, in order to perform the convolution computation, the additions in Eq. 5 must be replaced with subtractions. Therefore, to use the FT approach, either y or x needs to be reversed in both dimensions before the convolutions take place. Considerations for performing 2D convolutions with the FT have been described previously (Handbook of Image and Video Processing, Alan C. Bovik, Chapter 2.3). The output of the 2D convolution is a 2D data set where the peak maximum in one dimension yields the m/z shift of the chunk with respect to the control data set, and the peak maximum in the other dimension yields the retention time shift with respect to the control data set. These properties are graphically illustrated in FIGS. 8A-8B, where FIG. 8A is the 2D convolution (Eq. 5) of the gradient-A data set (FIG. 5) with itself, and FIG. 8B is the 2D convolution of the gradient-A data set with another gradient-A data set where the instrument settings were adjusted to shift the mass spectra by ~2 Da. The resulting cross correlation peak for FIG. 8A is centered at zero m/z shift and zero time shift, while the cross correlation peak for FIG. 8B is shifted in m/z by ~2 Da, and slightly shifted in time due to natural variation in the LC separation process. Clearly such a determination of the m/z shift of a spectrum relative to a control data set could be useful as a procedure to correct for unwanted instrumental drift in the measured m/z values.

It should be appreciated that the general issue of alignment over RT and/or m/z is one of optimization. While we have proposed a direct calculation of the correlation function as a prototype approach, one can implement other "obvious" variants: such as using features, e.g. edges, extremas, etc, instead of raw data points for the correlation calculation, and employing other search techniques, e.g. simplex search, to potentially arrive at the optimal alignment quickly.

Improved methods for determining and correcting retention time and/or m/z shifts in LC-MS data and experiments have been disclosed herein. The discussion included in this application is intended to serve as a basic description. The present invention is not intended to be limited in scope by the specific embodiments described herein, which are intended as single illustrations of individual aspects of the invention, and functionally equivalent methods and components are within the scope of the invention. Indeed, various modifications of the invention, in addition to those shown and described herein will become apparent to those skilled in the art from the foregoing description and accompanying drawings. Such modifications are intended to fall within the scope of the appended claims. Any patents, patent applications, patent application publications or other literature mentioned herein are hereby incorporated by reference herein in their respective entirety as if fully set forth herein, except that, in the event of any conflict between the incorporated reference and the present specification, the language of the present specification will control.

We claim:

1. A method for acquiring Liquid Chromatography Mass Spectrometry (LC-MS) data for a plurality of analytes within an unknown sample, the method comprising:
    performing a control experiment comprising an LC-MS analysis of a plurality of analytes within a control sample, thereby generating control data;
    recording the control data;
    choosing a chunk size that comprises a range, $\Delta_{RT}$, of chromatographic retention times and a range, $\Delta_{m/z}$, of mass-to-charge values;
    choosing a chunk of the control data (control chunk) having the chunk size;
    storing a set of data that includes the control chunk;
    scheduling tentative retention time windows for the plurality of analytes within the unknown sample based on the chromatographic retention times determined from the control data, each tentative retention time window comprising a respective start time and a respective stop time;
    performing at least a portion of an experiment comprising an LC-MS analysis of the unknown sample, thereby generating a sample chunk of LC-MS spectral data, the sample chunk comprising a range of retention times that is less than $\Delta_{RT}$ within the tentative retention time windows;
    calculating a cross-correlation function between the sample chunk and the control chunk;
    identifying, using the calculated cross-correlation function, a retention-time shift of the experiment comprising the LC-MS analysis of the unknown sample with respect to the control experiment;
    estimating m/z shift values of the sample chunk of the LC-MS spectral data of the unknown sample, relative to control data of the control chunk, based on results of a two dimensional cross-correlation calculation between the the control chunk and the sample chunk;
    generating a modified retention time window by adjusting a tentative retention time window in accordance with the identified retention-time shift; and
    acquiring mass spectrometry data from the unknown sample at a retention time window that is associated with the adjusted retention time window and using the estimated m/z values.

2. A method for acquiring LC-MS data as recited in claim 1, wherein the sample chunk and the control chunk both comprise mass spectral data of fragment-ion species generated within a fragmentation cell of a mass spectrometer.

3. Method for acquiring LC-MS data as recited in claim 1, wherein the calculation of the cross-correlation function between the sample chunk and the control chunk comprises calculating a function r (t) defined as:

$$r(t) = \sum_{j=0}^{q-1} \sum_{i=1}^{k} y(t + j\Delta t, i) x(p + j\Delta t, i)$$

where y (t, i) is the mass spectral intensity of the m/z value of the control chunk having integer-valued index, i, as measured at time, t, x (p+jΔt, i) is the mass spectral intensity of the m/z value of the sample chunk having index, i, as measured at time p+jΔt where Δt is a time increment and j is an integer-valued index, k is the number of m/z values in both the sample chunk and the control chunk, q is the number of mass spectra in the sample chunk and p is a time index of a first mass spectrum of the sample chunk.

4. A method for acquiring LC-MS data as recited in claim 3, wherein the sample chunk and the control chunk both comprise mass spectral data of fragment-ion species generated within a fragmentation cell of a mass spectrometer.

* * * * *